(No Model.)
E. G. HASTINGS.
CRIB FOR FEEDING CATTLE.
No. 467,973. Patented Feb. 2, 1892.
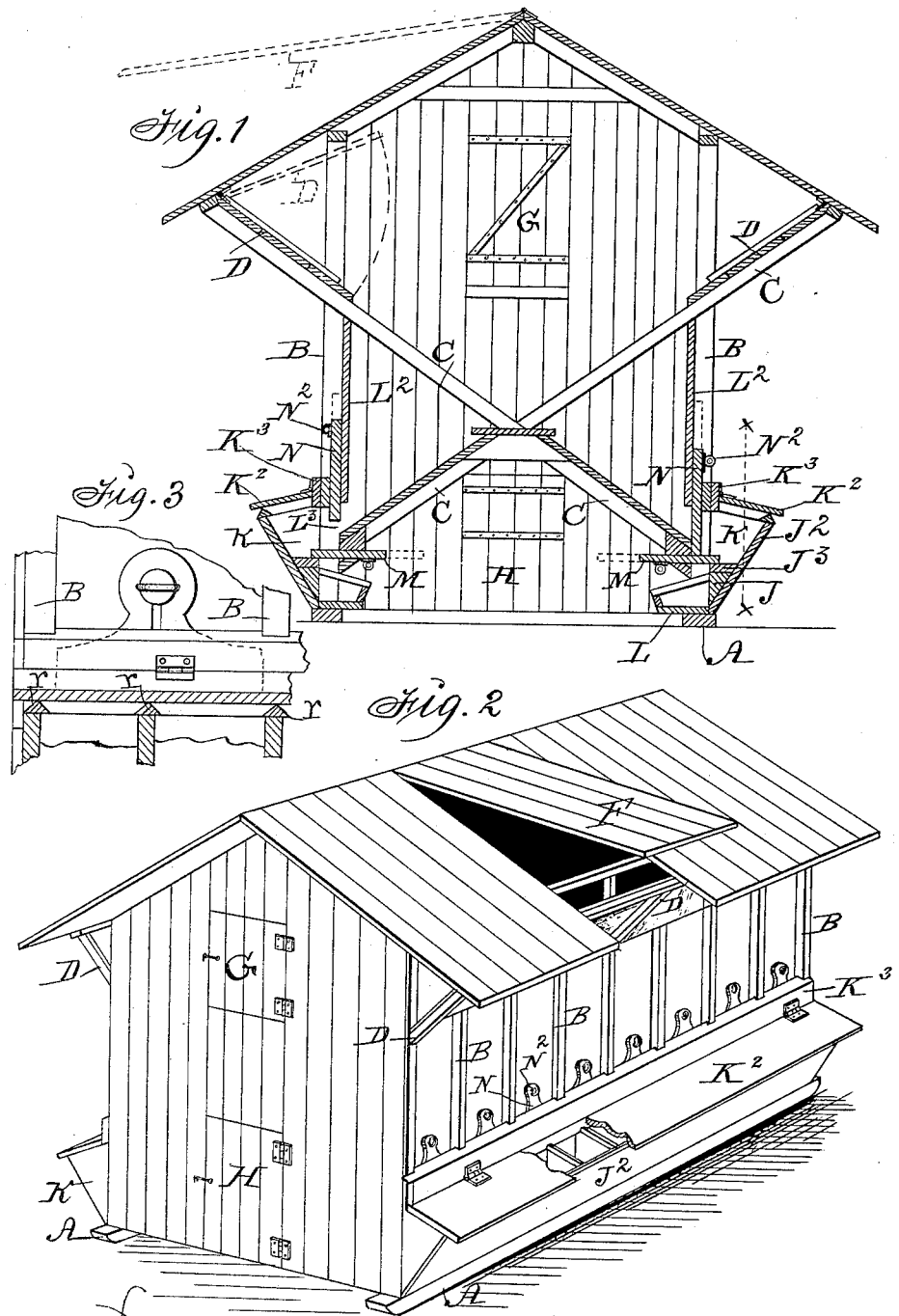

UNITED STATES PATENT OFFICE.

EDWIN G. HASTINGS, OF DES MOINES, IOWA.

CRIB FOR FEEDING CATTLE.

SPECIFICATION forming part of Letters Patent No. 467,973, dated February 2, 1892.

Application filed April 6, 1891. Serial No. 387,852. (No model.)

*To all whom it may concern:*

Be it known that I, EDWIN G. HASTINGS, a citizen of the United States of America, and a resident of Des Moines, in the county of Polk and State of Iowa, have invented an Improved Crib for Feeding Large and Small Animals, of which the following is a specification.

My object is to improve the construction and operation of a crib adapted for storing corn and other feed therein and to feed the same to large animals from mangers on the outside and shelter, protect, and feed small animals from troughs on the inside of the side walls and under the bottom of the crib, and also under the mangers; and my invention consists in certain details of construction and operation, as hereinafter set forth, pointed out in my claims, and illustrated in the accompanying drawings, in which—

Figure 1 is a transverse vertical sectional view showing the construction of the frame and the arrangement of the mangers, troughs, sliding cut-offs, and hinged roof and floor sections relative to the frame. Fig. 2 is a perspective view showing a section of the roof elevated, as required, to allow corn to be thrown in over the inclined floor at the top portion of the side wall. Fig. 3 is an enlarged detail view through the line $x$ $x$ of Fig. 1, showing the construction of the top of the manger and the top of a cut-off for closing communication between the crib and the manger.

A are sills rounded at their ends to serve as runners for moving the complete structure.

B are the upright pieces of the frame fixed to the sills.

C are truss-frames composed of pieces connected in crossed position and fixed to the upright pieces B at their lower ends, and also fixed to the same pieces at their upper portions. The lower portions of the pieces C are thus adapted to produce a double-inclined floor for the crib and a roof for the chamber for small animals, hogs, calves, sheep, &c., under the crib, and the upper portions of the same pieces C serve as a support for inclined floors or platforms D, projecting outward from the side walls of the crib, and also serve as braces in the complete frame and supports for the lower portions of the roof.

The platforms D are hinged at their outer and upper ends in such a manner that they can be raised at their lower ends to facilitate the filling of the lower portion of the crib with corn or other feed, and sections F of the roof are hinged at their upper ends so their lower ends can be raised to fill the top portion of the crib when the platforms D are in their normal closed positions.

G is a door in the end wall and gable of the crib, and H is a door in the end and bottom for the admission of persons and small animals.

J are triangular-shaped blocks fixed to the outside and bottom portions of the uprights B to support the inclined outer walls $J^2$ and the horizontal bottoms $J^3$ of mangers K, as clearly shown in Fig. 1.

$K^2$ are manger-covers hinged to pieces $K^3$, fixed to the uprights B.

L are the floors or feed-troughs, fitted and fixed to the lower ends of the uprights B and on top of the sills A.

$L^2$ are the side walls of the crib, fixed to the inside faces of the uprights B, and $L^3$ are open spaces at the bottoms of these walls that will allow feed to pass outward and downward from the inclined floor of the crib into the mangers and also into the troughs under the mangers.

M are cut-offs that slide horizontally in bearings fixed to the pieces B and C, as required, to open and close communication between the mangers and the troughs under the mangers whenever desired.

N are cut-offs that slide vertically between the uprights B and against the walls $L^2$, as required, to close communication between the crib and the mangers whenever desired.

$N^2$ are set-screws extended through slots in the top portions of the cut-offs N and into the wall $L^2$ to fasten them at any point of elevation desired and, as required, to regulate the escape of feed from the crib into the mangers and troughs.

Triangular-shaped moldings $r$ are fixed on the top edges of the walls and partitions of the mangers, as clearly shown in Fig. 3, to prevent animals from lifting and dropping feed from the mangers.

To clean the mangers and to convey the refuse feed left therein by cattle and other large animals to the troughs below, I enter the chamber under the crib and draw the sliding cut-offs M inward, while the cut-offs N are closed, as required, to retain the feed in the crib.

To convey feed direct from the crib to the troughs under the mangers, I open both the horizontally-sliding and vertically-sliding cut-offs and allow the feed to escape from the crib and to descend through the direct passage-ways leading to the troughs.

I claim as my invention—

1. In a crib for storing feed and feeding animals, a frame composed of posts at the corners and sides and straight pieces fixed together in crossed position and fixed to said posts at their lower ends on one side of the frame and to the posts on the other side of the frame at their top portions to project outward and upward, and platform-sections hinged at the top portions of said projections, arranged and combined to operate in the manner set forth, for the purposes stated.

2. An improved crib for feeding large and small animals, comprising a four-sided frame, in which the sides are connected by straight pieces fixed together in crossed position at their central parts and their upper ends projected outward and upward to support platform-sections and a roof, platform-sections hinged to the top ends of the said projections, floors fixed to the lower portions of said crossed pieces, a trough extending along the lower ends of the crossed pieces and floor thereon and outside of the side walls, openings in the said walls to allow feed to slide out into the said troughs, vertically-moving slides to close said openings in the wall, troughs extending inside of the side walls and under the troughs on the outside of the wall, openings between the upper and lower troughs to allow feed to fall from the upper into the lower troughs, and horizontally-moving slides to close the said openings, arranged and combined to operate in the manner set forth, for the purposes stated.

3. In a crib for feeding large and small animals, the vertically-sliding cut-off N and the horizontally-sliding cut-off M, in combination with a manger above the said cut-off M and a trough below the same cut-off, arranged and combined with the inclined floor and the side wall, to operate in the manner set forth, for the purposes stated.

EDWIN G. HASTINGS.

Witnesses:
J. RALPH ORWIG,
THOMAS G. ORWIG.